119,666

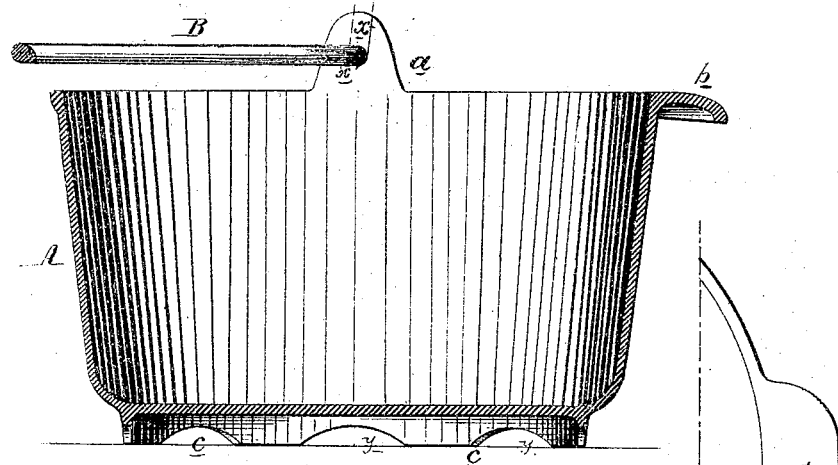
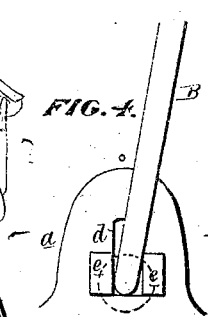
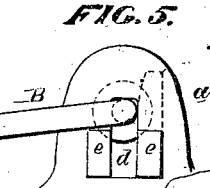
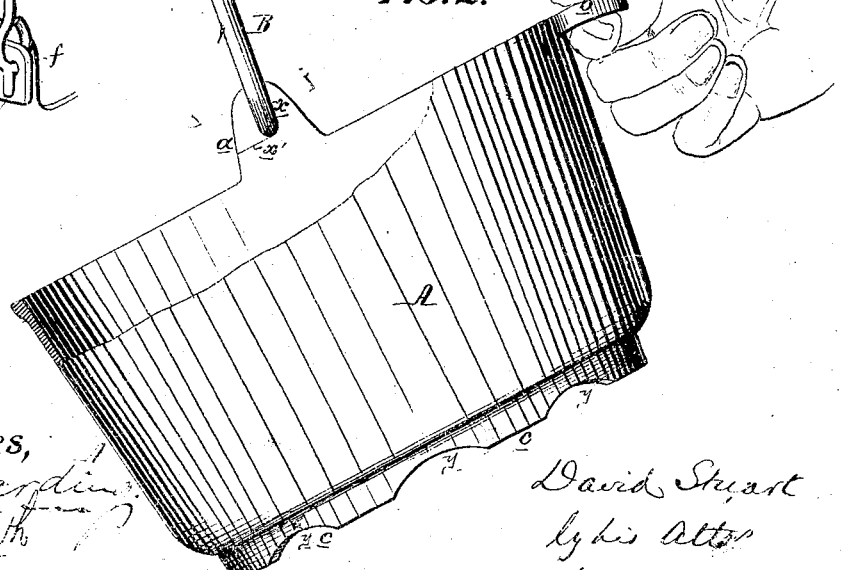

UNITED STATES PATENT OFFICE.

DAVID STUART, OF PHILADELPHIA, PENNSYLVANIA.

IMPROVEMENT IN KETTLES.

Specification forming part of Letters Patent No. 119,666, dated October 3, 1871.

*To all whom it may concern:*

Be it known that I, DAVID STUART, of Philadelphia, county of Philadelphia, State of Pennsylvania, have invented an Improvement in Preserving and other Kettles, of which the following is a specification:

My invention consists of certain improvements in preserving and other kettles, too fully explained hereafter to need preliminary description, the said improvements having been designed with the view of facilitating the handling of the kettle while pouring the contents from the same, of preventing the heating of the bail or handle, and of insuring a circulation beneath the said kettle, under the circumstances described hereafter, so as to prevent the undue heating of the bottom of the same.

Figure 1 is a sectional view of a preserving-kettle with my improvements; Fig. 2, a side view, partly in section, showing the method of handling the kettle in pouring the contents from the same; Fig. 3, a plan view of part of the top of the kettle; and Figs. 4, 5, and 6, views representing modifications of my invention.

A represents a preserving-kettle of the same general form as those in common use, and having on its upper edge, at opposite points, two lugs, $a$ $a$, to which is attached the bail or handle B. The latter in an ordinary preserving-kettle turns freely upon the lugs from one side to the other and rests upon the edge of the kettle, the consequence being that the bail becomes heated as well as the kettle when the latter is placed upon a stove, and cannot be grasped by the hand alone without the use of a cloth or other protector. It is also a matter of some difficulty to pour the contents from an ordinary preserving-kettle having a freely-turning bail and a perfectly smooth exterior, as one hand must be placed beneath the kettle in order to turn it, while with the other hand the bail must be held rigidly and in a position nearly at right angles to the top of the kettle. These objections I have overcome by forming stops or shoulders $x$ and $x'$ upon the lugs $a$ for limiting the movement of the bail, and by casting upon one side of the kettle a handle or lip, $b$. The stops $x$ prevent the bail from being turned over toward the lip $b$, and are somewhat inclined, so that, when the bail is elevated and turned to a position slightly beyond the perpendicular, it shall strike against and be retained in such position by the said stops, as shown by dotted lines in Fig. 1, the heating of the bail being thus prevented when the kettle is placed upon a stove. The stops $x'$ prevent the bail from being brought into actual contact with the edge of the kettle when the said bail is turned downward, but retain it in a position slightly above the said kettle, so that it can be readily seized and lifted. The stops $x$, besides holding the bail in an elevated position when the kettle is placed upon a stove, serve also to prevent the said bail from turning further than to a position about at right angles to the upper edge of the vessel, and retain it in the most advantageous position for sustaining the kettle in the act of tilting the latter to pour out the contents, this operation being also facilitated by the lip $b$, which serves as a handle, by which the kettle may be lifted and tilted from one side much more advantageously than by placing the hand beneath the kettle, as usual. (See Fig. 2.) It is not absolutely necessary that the lip $b$ should be formed at the extreme upper edge of the kettle, as shown in the drawing, as it might be arranged at any convenient point on the side of the same; nor is it essential, in carrying out my invention, that the stops $x$ and $x'$ should be employed for retaining and limiting the movement of the bail, as various equivalent devices may be used. In Figs. 4 and 5, for instance, the bail passes through an elongated vertical slot, $d$, in each lug $a$, and is retained in a vertical or nearly vertical position by projections or stops $e$ $e$ at either side of the said slot, close to the bottom of the same. When the bail is lifted it will rise to the top of the slot $d$, and can then be turned in either direction, as shown in Fig. 5; or, if desired, one of the projections $e$ may be elongated, as shown by dotted lines in the latter figure, so as to act in the same manner as the stop $x$ in retaining and preventing the movement of the bail in one direction.

Another modification is shown in Fig. 6, where the bail passes over the lug $a$, is hung to a projection, $f$, on the outer side of the same, and has itself a projecting tongue, $h$, which strikes against the said projection $f$, thus preventing the bail from turning beyond a certain point, and retaining it in an elevated position in the same manner as the stop $x$. This latter plan enables a lid to be fitted to the kettle, which cannot be readily done when the bail is attached to the inner sides of the lugs, as in the other modifications.

Another feature of my invention is the rib $e$ at the bottom of the kettle, with its recesses $y$, in place of the usual plain rib. This recessed rib enables air to circulate beneath the bottom of the kettle when the latter is placed upon the hot top plates of a stove, and thus prevents that undue heating of the bottom of the kettle which is apt to result when the usual plain or continuous rib is employed, while, as it is nearly continuous, it is not liable to be broken as are the usual isolated legs.

My improvements, although especially applicable to preserving-kettles, can, it will be evident, be applied to other kettles.

I claim as my invention—

1. A preserving or other kettle provided with a bail, which, after being raised to an upright position, is retained, substantially in the manner and for the purpose described.

2. In a preserving or other kettle, a bail restricted in its movements, substantially as described, in combination with a lip, $b$.

3. A kettle provided with an annular flange, $c$, in which are recesses $y$, as and for the purpose specified.

In testimony whereof I have signed my name to this specification in the presence of two subscribing witnesses.

DAVID STUART.

Witnesses:
WM. A. STEEL,
HARRY SMITH.